(12) United States Patent
Travis et al.

(10) Patent No.: US 9,147,083 B1
(45) Date of Patent: *Sep. 29, 2015

(54) MARKING AND OBSCURING SENSITIVE VALUES IN TRACES

(71) Applicant: Pivotal Software, Inc., Palo Alto, CA (US)

(72) Inventors: Jonathan Travis, San Francisco, CA (US); Scott Andrews, Nashua, NH (US); John Victor Kew, Seattle, WA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,857

(22) Filed: Oct. 6, 2014

Related U.S. Application Data

(63) Continuation of application No. 13/352,753, filed on Jan. 18, 2012, now Pat. No. 8,881,296.

(51) Int. Cl.
*G06F 21/62* (2013.01)

(52) U.S. Cl.
CPC ........ *G06F 21/6218* (2013.01); *G06F 21/6281* (2013.01)

(58) Field of Classification Search
CPC combination set(s) only.
See application file for complete search history.

(56) References Cited

U.S. PATENT DOCUMENTS 7,644,440 B2 * 1/2010 Sinha et al. ............... 726/23
8,881,296 B2 * 11/2014 Travis et al. ............... 726/26

OTHER PUBLICATIONS

"Transaction Tracing (available on Pro and Business Pack subscriptions)", http://newrelic.com/docsfdocs/transaction- tracing-available-on-pro-and-business-pack-subscriptions, visited on Jan. 11, 2012, pp. 1-5, New Relic, Inc. US.

* cited by examiner

*Primary Examiner* — Beemnet Dada
(74) *Attorney, Agent, or Firm* — Fish & Richardson P.C.

(57) ABSTRACT

In one embodiment, a method for processing trace data is provided. The method generates trace data during execution of the target application and obtains criteria for identifying whether a value in the trace data is sensitive. An initial occurrence of a sensitive value in the trace data is identified based on the obtained criteria. The method then stores the sensitive value in a data structure accessible by an obscuring process. The obscuring process receives the trace data and obscures occurrences of the sensitive value in the trace data prior to providing the trace data for display.

36 Claims, 5 Drawing Sheets

MARKING AND OBSCURING SENSITIVE VALUES IN TRACES

CROSS-REFERENCE TO RELATED APPLICATION

This application is a continuation of U.S. patent application Ser. No. 13/352,753, filed Jan. 18, 2012, titled "Marking And Obscuring Sensitive Values in Traces".

BACKGROUND

Instrumentation tools, such as Spring Insight from the SpringSource division of VMware, Inc., are able to monitor the execution of a "target" application, such as a web application, by inserting instrumentation code into the target application, for example, during loading of the target application into a runtime environment, such as a Java virtual machine or an application server such as Apache Tomcat. When executed, the instrumentation code, in real-time captures pieces of data (e.g., referred to as operations), such as which methods or functions of the target application are being called, the arguments of such methods, how long methods run, etc. The captured pieces of data are referred to as a "trace" and may be sent by the instrumentation code to a separate user interface application (referred to herein as a "profiler") that an administrator may use to display and analyze the trace. The trace may help an administrator monitor application performance metrics and analyze any problems that occurred during the execution of the application, such as problematic web requests or method calls ending in errors.

The target application, depending upon its purpose, may process data that contains sensitive information, such as credit card numbers/security codes and passwords. For example, the target application may be an ecommerce web application that provides users the ability to enter credit card information or may be a payroll web application that enables employees to enter usernames and passwords to access their payroll information. Such sensitive information may be ultimately passed through various components of the target application, including as arguments and results in methods, database calls, etc. When an administrator utilizes an instrumentation tool that inserts instrumentation code into such target applications, the trace captured by such instrumentation code that is ultimately transmitted to and displayed by a profiler may thus include such sensitive information. As such, a developer of the target application (or other interested party, such as a primary administrator deploying the target application across business units within an enterprise who is sensitized to the possibility of administrators within such business units using such instrumentation tools to manage performance of their particular deployment of the target application) may not want such sensitive information included in the trace, for example, to protect sensitive information of users of the target application from be revealed to an administrator who is analyzing the performance of the application.

SUMMARY

In one embodiment, a method for processing trace data is provided. The method generates trace data during execution of the target application and obtains criteria for identifying whether a value in the trace data is sensitive. Instrumentation code in the target application is configured to monitor execution of the target application and to generate the trace data describing the execution of the target application. An initial occurrence of a sensitive value in the trace data is identified based on the obtained criteria. The method then stores the sensitive value in a data structure accessible by an obscuring process. The obscuring process receives the trace data and obscures occurrences of the sensitive value in the trace data prior to providing the trace data for persistence, transmission, or display.

In another embodiment, a non-transitory computer-readable storage medium containing instructions for processing trace data based on execution of a target application is provided. The instructions are for controlling a computer system to be operable to: generate trace data during execution of the target application, wherein instrumentation code in the target application is configured to monitor execution of the target application and to generate the trace data describing the execution of target application; obtain criteria for identifying whether a value in the trace data is sensitive; identify an initial occurrence of a sensitive value in the trace data based on the obtained criteria; and store the sensitive value in a data structure accessible by an obscuring process, wherein the obscuring process receives the trace data and obscures occurrences of the sensitive value in the trace data prior to providing the trace data for persistence, transmission, or display.

In one embodiment, an apparatus is configured to process a trace based on execution of a target application. The apparatus includes one or more computer processors and a computer-readable storage medium comprising instructions for controlling the one or more computer processors to be operable to: generate trace data during execution of the target application, wherein instrumentation code in the target application is configured to monitor execution of the target application and to generate the trace data describing the execution of target application; obtain criteria for identifying whether a value in the trace data is sensitive; identify an initial occurrence of a sensitive value in the trace data based on the obtained criteria; and store the sensitive value in a data structure accessible by an obscuring process, wherein the obscuring process receives the trace data and obscures occurrences of the sensitive value in the trace data prior to providing the trace data for persistence, transmission, or display.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
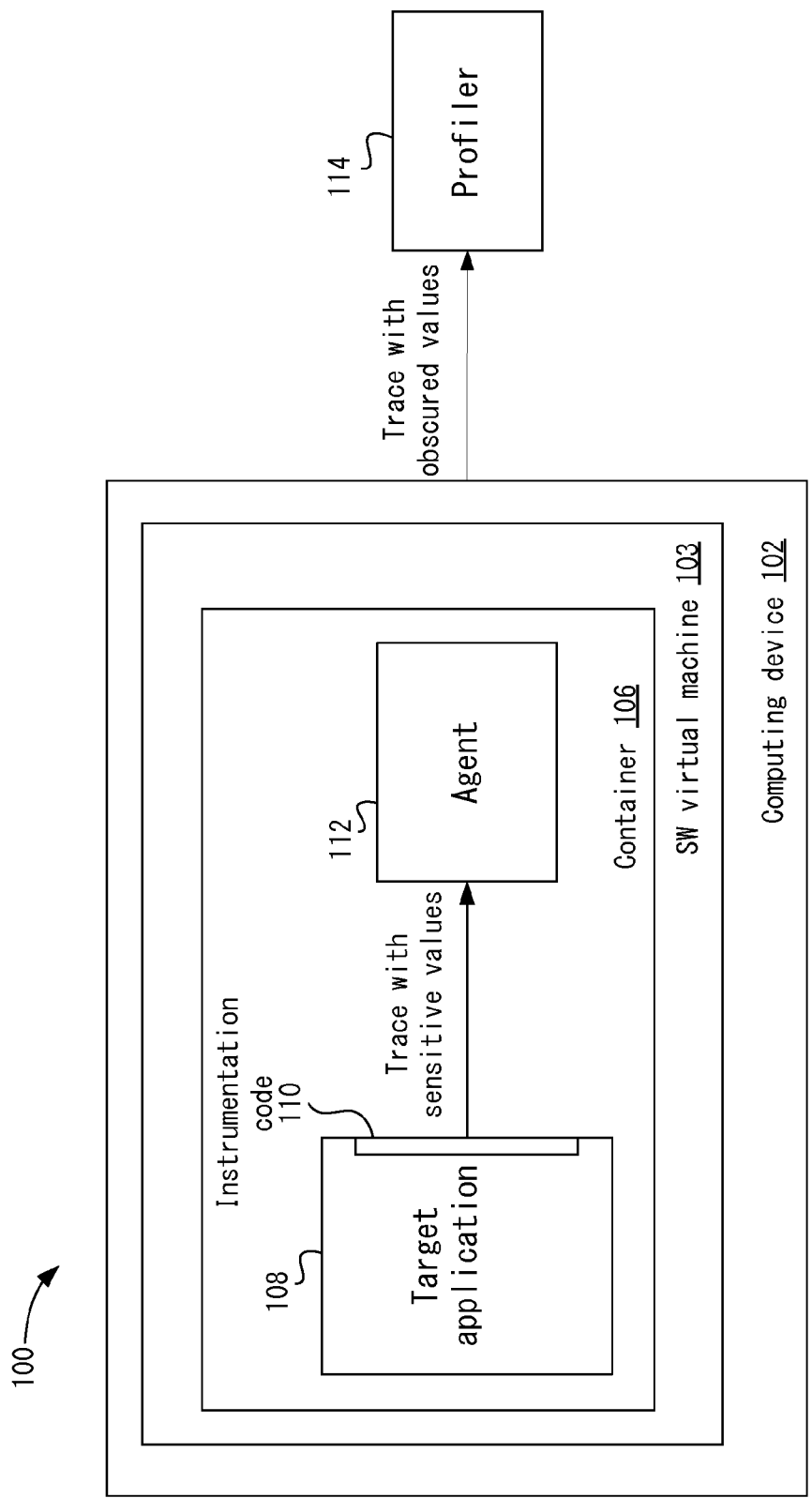
FIG. 1 depicts a simplified system for marking and obscuring sensitive values in a trace according to one embodiment.

FIG. 1 depicts a simplified system 100 for marking and obscuring sensitive values in a trace according to one embodiment. A computing device 102 includes a software virtual machine 103, such as a Java virtual machine (JVM), and a container 106 that includes a target application 108 and an agent 112. In one embodiment, container 106 may be an Apache Tomcat™ server. As further detailed below, agent 112 is a functional component or module running in container 106 that communicates with a profiler 114. Although this software environment is described, other environments may be used.

Target application 108 executes in container 106. For example, target application 108 is a web application that receives requests, such as hypertext transfer protocol (HTTP) requests, and responds to the requests. Although web applications are discussed, target application 108 may include other applications that process sensitive values, and may not be processing external requests.

Target application 108 includes instrumentation code 110 that captures information during the execution of target application 108. The information that is captured is referred to as a "trace of operations". For example, as target application 108 executes, instrumentation code 110 captures the trace of operations, information in formats (or data objects) referred to herein as "operations.' The operations may contain information that describe the execution of target application 108, such as an operation that describes a login process that is called using various method and database calls by target application 108. The operations are designed to help a user understand the execution of target application 108. For example, an operation describes a method call. Examples of a trace of operations are described in more detail below.

As previously discussed, in one embodiment, such instrumentation code 110 is added to target application 108 by an administrator wishing to deploy and analyze the performance of target application 108 within an enterprise (e.g., as opposed to being part of target application 108 as created by the actual developer of target application 108). For example, if target application 108 is a Java web application running in Apache Tomcat (i.e., container 106), prior to deploying target application 108 in Apache Tomcat, the administrator may add instrumentation code 110 in the form of various .jar files into a file system folder in the Apache Tomcat environment that can be accessed by target application 108 during its execution. Instrumentation code 110 includes logic to determine which information to capture as target application 108 executes.

The operations captured may include sensitive values. In one embodiment, sensitive values are any values that an operator of target application 108 may not want included in a trace, transmitted to another process or machine, or persisted. For example, sensitive values may include credit card numbers, usernames, or passwords. One example of how sensitive values could be captured is where target application 108 receives a request from a user to log onto a website. The user may enter a username and password and attempt to log in. Target application 108 may execute a method call when a user logs into the website. The method call may be represented generically as "method call login(string username, string password)", where "login" is a name of the method to be called, "string username" represents a string argument to be included for the user's username, and "string password" represents a string argument to be included for the user's password. Instrumentation code 110 may capture an operation for the method call. The operation may describe the method call and also include the arguments that are sent using the method call, such as the username and password. For example, if the username is "user x" and the password is "password Y", the operation that is captured may include "login(user X, password Y)". It should be noted that this example is a generic example and a more detailed example is described below. In the operation, an operator of target application 108 may consider the arguments for username and password (e.g., user x and password y) to be sensitive values. Because of the sensitivity, the operator may want these values to be obscured. For example, in the trace, username X may be replaced with "xxx" and password Y may be replaced with "xxx" such that when a user views the trace, the operation displayed is "login (XXX, XXX)".

Particular embodiments use a "marking" and "obscuring" process to determine and obscure sensitive values from the trace of operations. In the marking process, instrumentation code 110 identifies values that are considered sensitive. In the obscuring process, agent 112 receives a trace of operations from instrumentation code 110 and obscures the identified sensitive values from the trace of operations. Once agent 112 obscures sensitive values from the trace of operations, it forwards or otherwise provides upon request such trace to profiler 114 for display to an administrator. In one embodiment, agent 112 is a software component that is installed or is otherwise incorporated into container 106 (e.g., Apache Tomcat, etc.) and runs as a separate thread or process within container 106 alongside target application 108.

In the marking process, instrumentation code 110 may capture information as target application 108 executes. For example, for each request, such as a web request to target application 108, processed by target application 108, instrumentation code 110 intercepts such request and creates a trace object that includes a trace of operations for the processing of the request until a response is sent. The trace object may be a unit that stores a trace of operations. In one embodiment, instrumentation code 110 creates a trace object for each request. The operations that are captured for the processing of the request are stored in the trace object. To process requests, in one embodiment, instrumentation code 110 is able to intercept such requests via byte-code modification of target application 108. Although creating a trace object for each request is described, instrumentation code 110 may create a trace object that includes a trace of operations for multiple requests also.

As further described below, instrumentation code 110 is able to identify a sensitive value in a captured operation and then "mark" such sensitive value for obscuring by agent 112. In one embodiment, when instrumentation code 110 encounters and identifies an occurrence of a sensitive value during execution of target application 108, instrumentation code 110 may "mark" the sensitive value by storing the sensitive value in an obscuring "registry" or other data structure (e.g., RAM memory in embodiments), which generally maintains a list of sensitive values that instrumentation code 110 encountered thus far during execution of target application 108. For example, if target application 108 is an ecommerce web application that requires a user to login to utilize a shopping card functionality, the user may provide to target application 108 certain sensitive values, such as "user x" and "password Y", that are intercepted and stored into the obscuring registry by instrumentation code 110. In another example, if instrumentation code 110 captures a credit card security value of "696," instrumentation code 110 stores the value of "696" in the obscuring registry. In certain embodiments, the obscuring registry may be included in the trace object or may be stored separately and linked with the trace object. When target application 108 finishes processing the request, instrumentation code 110 may provide the trace object, which includes the trace of operations and also the obscuring registry, to agent 112, as previously discussed.

Once agent 112 receives the trace object including the trace of operations, it then is able to perform the obscuring process. For example, agent 112 may remove or mask sensitive values in the trace of operations. As will be described in more detail below, elements (e.g., each word) of the trace of operations may be traversed and sensitive values from the obscuring registry that are encountered are replaced by string or numerical replacements. For example, if the obscuring registry includes the sensitive values of username x and password Y, agent 112 scans the trace of operations to determine any instances of username x and password Y. These instances are then replaced by a string of "xxx".

Once agent 112 has obscured the sensitive values in the trace of operations, it can then send the trace object including the trace of operations with the obscured values to a profiler 114. Profiler 114 may then display the trace with the obscured values. For example, the trace of operations may be represented in a frame stack format that shows the operations with obscured values. In another embodiment, the trace object may also be saved to disk for later analysis, instead of being sent directly to the profiler 114.

Figure 2:
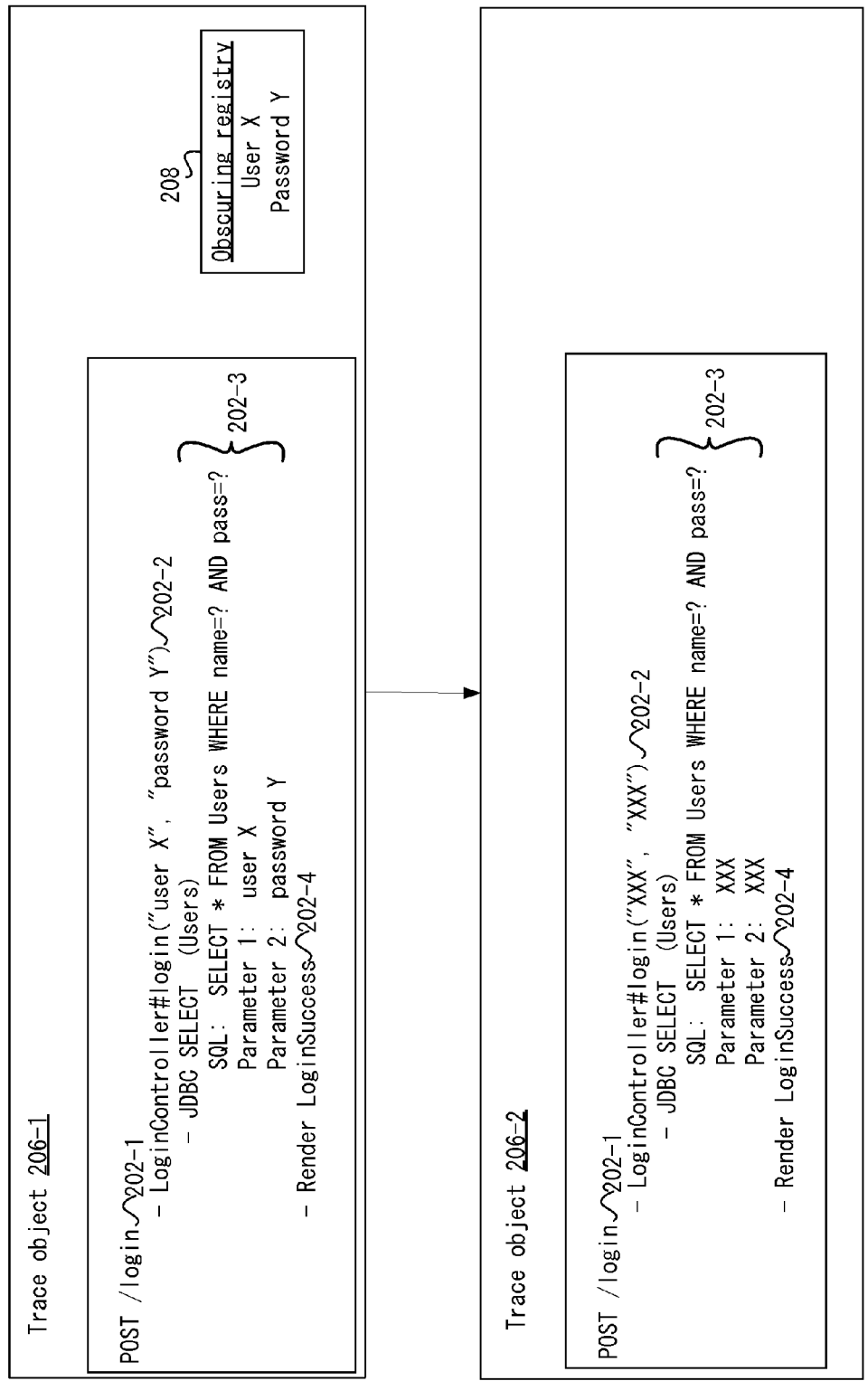
FIG. 2 shows an example of marking and obscuring sensitive values for a trace according to one embodiment.

FIG. 2 shows an example of marking and obscuring sensitive values for a trace of operations according to one embodiment. A trace object 206-1 includes a trace of operations that instrumentation code 110 has captured based on the execution of target application 108. The operations may be captured based on various method and database calls executed by target application 108. Some operations may include sensitive values. For example, an operation 202-2 of "LoginController#login ("user X", "password Y")" includes sensitive values of "user x" and "password Y". Instrumentation code 110 determines that these values are sensitive and stores the values in an obscuring registry 208. Instrumentation code 110 may use different ways to determine which values are sensitive, which are described in more detail below.

Trace object 206-1 includes another operation 202-3, which also includes the sensitive values of "user x" and "password Y". Because these values are already in obscuring registry 208, instrumentation code 110 does not store the values again. As will be discussed in more detail below, instrumentation code 110 may mark sensitive values only once for the trace of operations in trace object 206-1, but the obscuring process may obscure all instances of the sensitive values from the trace of operations in trace object 206-1. In other embodiments, multiple instances of a sensitive value may be marked and obscured. For example, instrumentation code 110 may store the sensitive value in obscuring registry 208 with a location in trace object 206-1. Then, the obscuring process may only remove that instance of the sensitive value.

Agent 112 performs the obscuring process on trace object 206-1. For example, when target application 108 finishes processing the request (such as by responding to the request), instrumentation code 110 may store trace object 206 in a queue. In one embodiment, the queue is located in shared memory with agent 112. Agent 112 may then retrieve trace object 206-1 from the shared memory. For example, at periodic times, agent 112 checks the shared memory for trace objects 206 and then performs the obscuring process. The asynchronous nature of this process allows target application 108 to serve other requests while agent 112 reviews and processes the trace. As such, in certain embodiments, agent 112 may perform the processing and obscuring of a recently captured trace of operations with minimal impact to the target application 108.

Trace object 206-2 shows a result of the obscuring performed by agent 112. In one example, agent 112 reads obscuring registry 208 to determine the sensitive values, such as user X and password Y. Then, agent 112 traverses elements of the trace of operations where each element may be tested against the sensitive values. An element may be any partitioning of the trace of operations, such as individual words, characters, whole operations, paragraphs, etc. Agent 112 may also scan multiple elements at once. Agent 112 obscures any elements of the trace that match or contain the sensitive values in obscuring registry 208. For example, agent 112 may first test an operation 202-1, which includes the elements of "POST" and "login" to determine if either element matches a sensitive value. POST and login do not match user x or password Y, and the elements of POST and login are not obscured. Agent 112 then analyzes operation 202-2, which includes the element of "user x", and agent 112 determines this element matches a sensitive value and user x is obscured. The next element in operation 202-2 is "password Y", and agent 112 also obscures this element because password Y is in obscuring registry 208. The next operation 202-3 includes parameters of "user x" and "password Y". Target application 108 may have used these parameters in a database call. Agent 112 also obscures elements of "user x" and "password Y" in operation 202-3. Although instrumentation code 110 did not mark these specific elements as sensitive, agent 112 may nevertheless obscure the elements. This ensures that any occurrence of the sensitive values in trace object 206-1 is obscured. Agent 112 then does not obscure any elements in operation 202-4 and the obscuring process ends. As is shown in trace object 206-2, agent 112 has replaced any instances of "user x" and "password Y" with "xxx". Profiler 114 may then receive and display a representation of trace object 206-2 instead of trace object 206-1.

Figure 3:
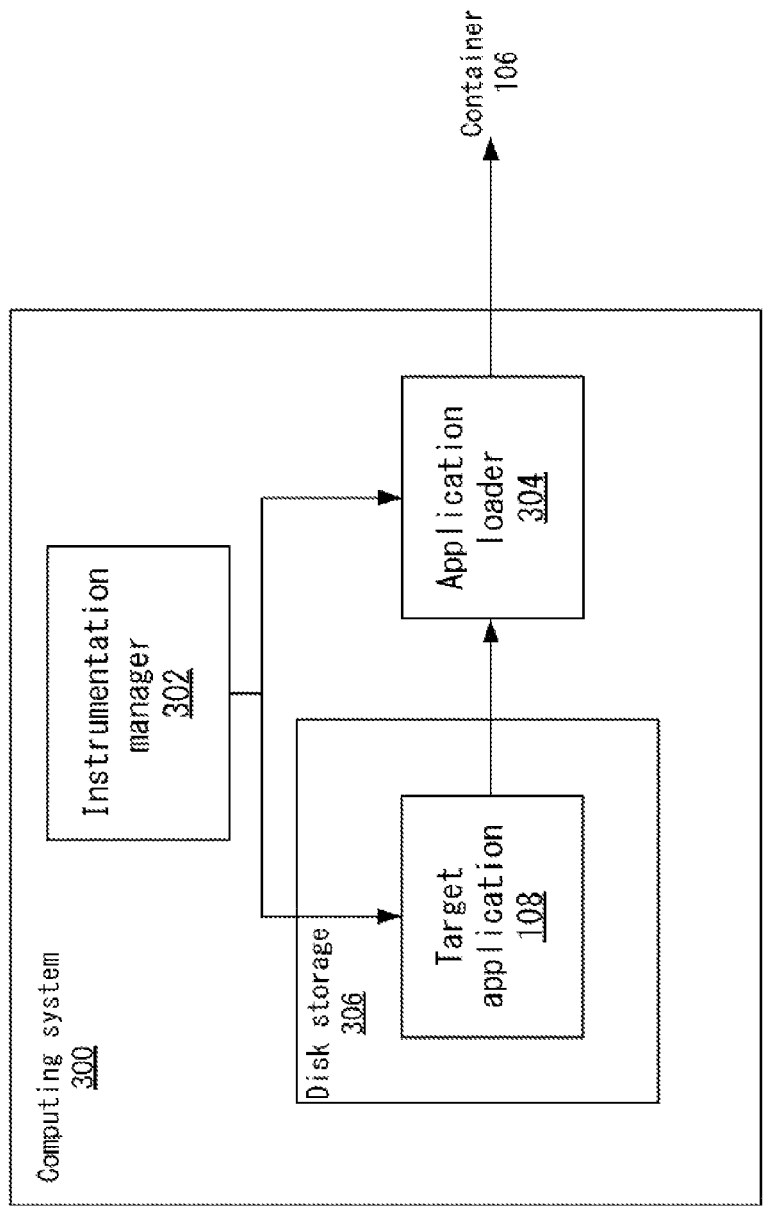
FIG. 3 depicts a simplified system for instrumenting a target application.

Target application 108 may be "instrumented" in different ways. FIG. 3 depicts a simplified computing system 300 for instrumenting target application 108. An instrumentation manager 302 may insert instrumentation code 110 into target application 108 at different times. For example, instrumentation manager 302 may insert instrumentation code into target application 108 when target application 108 is loaded into container 106, such as by an application loader 304. Target application 108 may be compiled into byte code in which instrumentation manager 302 performs byte code instrumentation to weave instrumentation code 110 into target application 108 as target application 108 is being loaded. Another way of instrumenting target application 108 is to perform the instrumentation while target application 108 is stored in disk storage 306. For example, instrumentation manager 302 may rewrite target application 108 to include instrumentation code 110. When application loader 304 loads target application 108, the re-written target application 108 with instrumentation code 110 is loaded into container 106 from disk storage 306.

Figure 4:
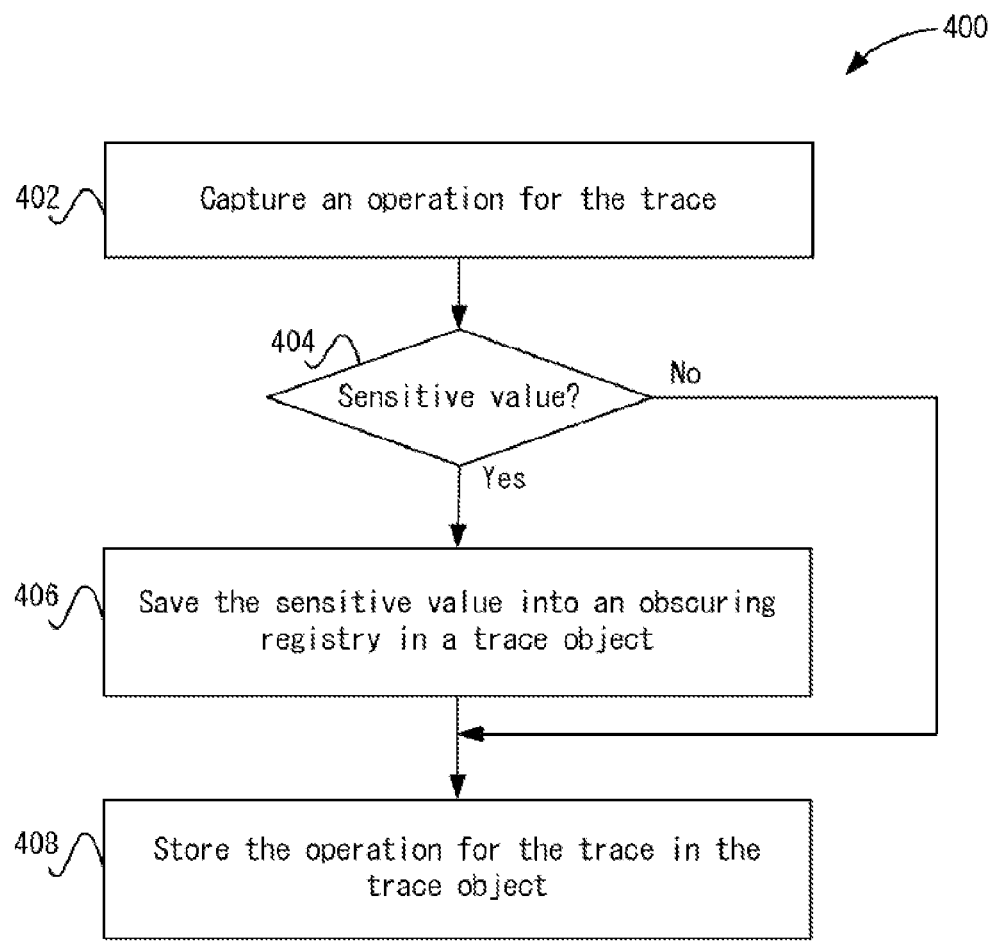
FIG. 4 depicts a simplified flowchart of a method for performing marking according to one embodiment.

Instrumentation code 110 may identify or otherwise determine which values are sensitive in different ways. FIG. 4 depicts a simplified flowchart 400 of a method for performing marking according to one embodiment. At 402, instrumentation code 110 captures an operation based on execution of target application 108. For example, instrumentation code 110 captures an operation or operations based on one or more method calls or database calls that are performed by target application 108. Additionally, instrumentation code 110 may capture an operation based on any information returned from the method calls or database calls. The operation that is captured may describe the execution in a form determined by an operator. For example, the operation may include identification information for the method call and also the parameters used in the method call.

At 404, instrumentation code 110 determines if a sensitive value is contained in the operation. Different methods may be used to determine if a sensitive value is contained in the operation. For example, target application 108 may be annotated, such as by a programmer, to indicate that a value is sensitive. The annotation may be a source code level annotation that inserts a value, such as "@sensitive" into the code of target application 108 to indicate a value that may be captured by instrumentation code 110 is sensitive. For example, a method argument may be annotated as being sensitive by including @sensitive before the argument. In one example, a programmer may annotate a method call to be "public void login(@sensitive string username, @sensitive string password)." in an alternative embodiment, an automatic process rather than a programmer may search target application 108 and insert the annotations into the source code of target application 108. When instrumentation code 110 encounters @sensitive in the method call, the arguments used in the method call for string username and string password are marked as sensitive values by instrumentation code 110, as described above.

In another example, instrumentation code 110 uses an external configuration file to determine which values are sensitive. For example, container 106 may load a configuration file when target application 108 is loaded. The configuration file may identify certain arguments in target application 108 that should be considered sensitive. Similar to the example above using the annotation, the configuration file may identify the arguments of string username and string password in the login method as being sensitive. For example, a signature of the method call is used to identify the method and which arguments are sensitive.

In another example, instrumentation code 110 may include code that analyzes a pattern, such as a regular expression or other string matcher, to identify sensitive values. In one such example, the regular expression to be evaluated may be obtained from an external configuration file as discussed above or may alternatively be hardcoded into instrumentation code 110. For example, for each element of an operation that is captured, instrumentation code 110 may attempt to match the regular expression to values contained within the operation. A simplified regular expression for a credit card number may be "xxxx-xxxx-xxxx-xxxx", wherein "x" may be any integer. Thus, instrumentation code 110 determines a value is sensitive when the value matches any combination of numbers in that format.

In yet another example, target application 108 may include information to notify instrumentation code 110 of sensitive values during processing of the request. For example, parameters in an HTTP POST operation may include sensitive values, such as a username. Instrumentation code 110 may notice the sensitivity when target application 108 explicitly navigates and identifies the POST parameters based on annotations that are unique to instrumentation code 110. Also, when target application 108 is reading a credit card security code (CSC) file, instrumentation code 110 notices that the CSC file includes sensitive values as the file is being read.

In another example, a user programmer identify a value as sensitive once in target application 108. For example, in FIG. 2, the login method associated with operation 202-2 "LoginController#login ("user X", "password Y") is identified by the programmer as including sensitive values for the arguments of username and password, such as using the annotation method described above. Then, instrumentation code 110 marks the values for the arguments (user x and password y) as being sensitive. The programmer does not need to mark target application 108 to have other occurrences of the sensitive values obscured. For example, agent 112 obscures user x and password Y in operation 202-3 without the parameters of operation 202-3 being identified as sensitive. Using the annotation example, the programmer marks the arguments username and password in the login method as sensitive, but does not have to mark the parameters for the database call.

Referring back to FIG. 4, if instrumentation code 110 determines a sensitive value is not included in the operation, the process reiterates to 402 to determine additional operations for the trace of operations. If instrumentation code 110 determines a sensitive value is included in the operation, at 406, instrumentation code 110 saves the sensitive value into obscuring registry 208 in trace object 206. At 408, instrumentation code 110 stores the operation for the trace of operations in trace object 206. At 404, if instrumentation code 110 determines a sensitive value is not included in the operation, instrumentation code stores the operation for the trace of operations in trace object 206 at 408. Instrumentation code 110 continues to perform the above process as target application 108 processes the request.

Figure 5:
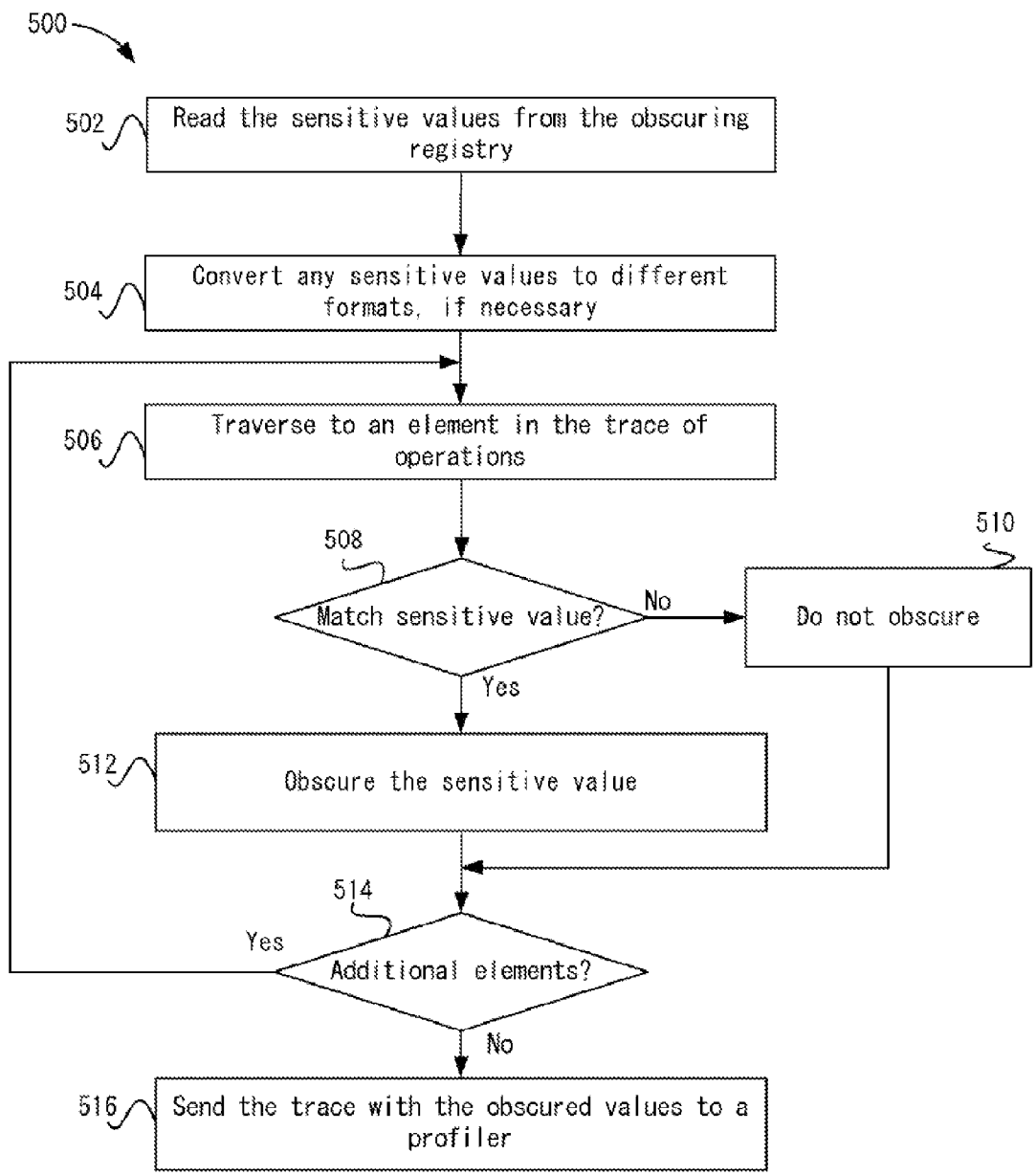
FIG. 5 depicts a simplified flowchart of a method for obscuring sensitive values according to one embodiment.

At periodic times, agent 112 may read the queue to determine if instrumentation code 110 has stored any trace objects 206 in the queue. For example, agent 112 may wake up at periodic times to perform the obscuring. FIG. 5 depicts a simplified flowchart 500 of a method for obscuring sensitive values according to one embodiment. At 502, agent 112 reads the sensitive values from obscuring registry 208. In some cases, a sensitive value may be found in the trace of operations in different formats. For example, the sensitive value may be stored as an integer value in obscuring registry 208. However, the sensitive value may be included as both an integer and a string in the trace of operations. If agent 112 only searches for an integer value, the string value may not be found and obscured. Thus, at 504, agent 112 may convert any sensitive values to different formats. In one example, integers may be converted to corresponding string values such that the value can be recognized in string objects. Additionally, strings that may contain integers may have portions of the string converted into an integer. In one example, obscuring registry 208 includes a CSV number that is represented as an integer. If the CSV value is "696", then "696" may be removed entirely from the trace of operations when used an integer. However, another method call may be made where "696" is used as a string parameter. Thus, by having agent 112 convert values from the integer to the string, agent 112 can also detect the "696" value in the other method call as sensitive and obscure the value.

At 506, agent 112 traverses to an element in the trace of operations. Agent 112 may need to convert the traversed element to another format to make the comparison with a sensitive value. At 508, agent 112 determines if the element matches a sensitive value. If not, at 510, the element is not obscured. At 512, if the element matches a sensitive value, agent 112 obscures the sensitive value.

At 514, agent 112 determines if additional elements need to be traversed. If so, the process reiterates to 506 to determine another element. If additional elements do not need to be traversed, then agent 112 stops traversing of the trace of operations. At 516, agent 112 then sends the trace of operations with the obscured values to profiler 114, which may then display the trace of operations.

Particular embodiments obscure sensitive values, but not non-sensitive values. Accordingly, a user may view the trace of operations that includes method arguments that are not considered sensitive, which may provide a more robust trace of operations that allows the user to analyze problems in target application 108.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A system comprising:
   one or more computers; and
   one or more non-transitory computer-readable storage media, operatively coupled to the one or more computers, comprising instructions that when executed cause the one or more computers to perform operations comprising:
   generating trace data, during execution of a target application, by instrumentation code in the target application monitoring execution of the target application;
   identifying, by the instrumentation code, occurrences of one or more sensitive values in the trace data, and storing each identified sensitive value in a data structure;
   obtaining a trace object that stores trace data;
   obtaining the sensitive values from the data structure;
   finding occurrences of sensitive values in the trace object, and
      for each of the occurrences, obscuring the sensitive value in the trace object, wherein obscuring the sensitive value includes replacing the sensitive value in the trace object with a respective obscuring value from which the sensitive value cannot be recovered; and
   providing the trace object, after obscuring the occurrences of the sensitive values, for presentation to a user.

2. The system of claim 1, wherein:
   obtaining the trace object, obtaining the sensitive values from the data structure, finding occurrences of the sensitive values in the trace object, and obscuring the occurrences of the sensitive values in the trace object are performed by an obscuring process that runs separately from the execution of the target application and the instrumentation code.

3. The system of claim 2, wherein generating trace data comprises:
   generating, by the instrumentation code, trace data in response to the target application receiving a request to perform operations;
   storing the trace data in a trace object during processing, by the target application, of the request; and
   storing the trace object in a queue of trace objects,
   wherein the trace data comprises at least one of (i) database responses received by the target application during execution, or (ii) web response contents received by the target application during execution.

4. The system of claim 1, wherein identifying an occurrence of a sensitive value in the trace data comprises:
   finding an annotation in the target application identifying a piece of software code in the target application as being associated with the sensitive value;
   capturing, from the trace data, a particular value associated with the annotation; and
   designating the particular value as the sensitive value.

5. The system of claim 1, wherein identifying an occurrence of a sensitive value in the trace data comprises:
obtaining information from a configuration file identifying a piece of software code in the target application as being associated with the sensitive value;
capturing, from the trace data, a particular value associated with the piece of software code; and
designating the particular value as the sensitive value.

6. The system of claim 1, wherein identifying an occurrence of a sensitive value in the trace data comprises:
determining that a pattern matching expression, applied to the trace data, matches a particular value; and
designating the particular value as the sensitive value.

7. The system of claim 1, wherein identifying an occurrence of a sensitive value in the trace data comprises:
receiving a notification from the target application that a particular value is sensitive.

8. The system of claim 1, wherein generating trace data comprises:
generating, by the instrumentation code, trace data in response to the target application receiving a request to perform operations;
storing the trace data in a trace object during processing, by the target application, of the request; and
storing the trace object in a queue of trace objects.

9. The system of claim 8, wherein obtaining the trace object comprises:
determining, at periodic times, whether the queue stores a trace object; and
upon a positive determination that the queue stores a trace object, obtaining the trace object from the queue.

10. The system of claim 1, wherein the trace data comprises at least one of (i) parameter values for methods invoked in the target application during execution, (ii) return values for methods invoked in the target application during execution, (iii) database queries transmitted by the target application during execution, (iv) database responses received by the target application during execution, (v) web request contents transmitted by the target application during execution, or (vi) web response contents received by the target application during execution.

11. One or more non-transitory computer-readable storage media containing instructions that when executed by one or more computers cause the one or more computers to perform operations comprising:
generating trace data, during execution of a target application, by instrumentation code in the target application monitoring execution of the target application;
identifying, by the instrumentation code, occurrences of one or more sensitive values in the trace data, and storing each identified sensitive value in a data structure;
obtaining a trace object that stores trace data;
obtaining the sensitive values from the data structure;
finding occurrences of sensitive values in the trace object, and
for each of the occurrences, obscuring the sensitive value in the trace object, wherein obscuring the sensitive value includes replacing the sensitive value in the trace object with a respective obscuring value from which the sensitive value cannot be recovered; and
providing the trace object, after obscuring the occurrences of the sensitive values, for presentation to a user.

12. The computer-readable storage media of claim 11, wherein:
obtaining the trace object, obtaining the sensitive values from the data structure, finding occurrences of the sensitive values in the trace object, and obscuring the occurrences of the sensitive values in the trace object are performed by an obscuring process that runs separately from the execution of the target application and the instrumentation code.

13. The computer-readable storage media of claim 12, wherein generating trace data comprises:
generating, by the instrumentation code, trace data in response to the target application receiving a request to perform operations;
storing the trace data in a trace object during processing, by the target application, of the request; and
storing the trace object in a queue of trace objects,
wherein the trace data comprises at least one of (i) database responses received by the target application during execution, or (ii) web response contents received by the target application during execution.

14. The computer-readable storage media of claim 11, wherein identifying an occurrence of a sensitive value in the trace data comprises:
finding an annotation in the target application identifying a piece of software code in the target application as being associated with the sensitive value;
capturing, from the trace data, a particular value associated with the annotation; and
designating the particular value as the sensitive value.

15. The computer-readable storage media of claim 11, wherein identifying an occurrence of a sensitive value in the trace data comprises:
obtaining information from a configuration file identifying a piece of software code in the target application as being associated with the sensitive value;
capturing, from the trace data, a particular value associated with the piece of software code; and
designating the particular value as the sensitive value.

16. The computer-readable storage media of claim 11, wherein identifying an occurrence of a sensitive value in the trace data comprises:
determining that a pattern matching expression, applied to the trace data, matches a particular value; and
designating the particular value as the sensitive value.

17. The computer-readable storage media of claim 11, wherein identifying an occurrence of a sensitive value in the trace data comprises:
receiving a notification from the target application that a particular value is sensitive.

18. The computer-readable storage media of claim 11, wherein generating trace data comprises:
generating, by the instrumentation code, trace data in response to the target application receiving a request to perform operations;
storing the trace data in a trace object during processing, by the target application, of the request; and
storing the trace object in a queue of trace objects.

19. The computer-readable storage media of claim 18, wherein obtaining the trace object comprises:
determining, at periodic times, whether the queue stores a trace object; and
upon a positive determination that the queue stores a trace object, obtaining the trace object from the queue.

20. The computer-readable storage media of claim 11, wherein the trace data comprises at least one of (i) parameter values for methods invoked in the target application during execution, (ii) return values for methods invoked in the target application during execution, (iii) database queries transmitted by the target application during execution, (iv) database responses received by the target application during execution, (v) web request contents transmitted by the target application during execution, or (vi) web response contents received by the target application during execution.

21. A method comprising:
generating trace data, during execution of a target application, by instrumentation code in the target application monitoring execution of the target application;
identifying, by the instrumentation code, occurrences of one or more sensitive values in the trace data, and storing each identified sensitive value in a data structure;
obtaining a trace object that stores trace data;
obtaining the sensitive values from the data structure;
finding occurrences of sensitive values in the trace object, and
for each of the occurrences, obscuring the sensitive value in the trace object, wherein obscuring the sensitive value includes replacing the sensitive value in the trace object with a respective obscuring value from which the sensitive value cannot be recovered; and
providing the trace object, after obscuring the occurrences of the sensitive values, for presentation to a user.

22. The method of claim 21, wherein:
obtaining the trace object, obtaining the sensitive values from the data structure, finding occurrences of the sensitive values in the trace object, and obscuring the occurrences of the sensitive values in the trace object are performed by an obscuring process that runs separately from the execution of the target application and the instrumentation code.

23. The method of claim 22, wherein generating trace data comprises:
generating, by the instrumentation code, trace data in response to the target application receiving a request to perform operations;
storing the trace data in a trace object during processing, by the target application, of the request; and
storing the trace object in a queue of trace objects,
wherein the trace data comprises at least one of (i) database responses received by the target application during execution, or (ii) web response contents received by the target application during execution.

24. The method of claim 21, wherein identifying an occurrence of a sensitive value in the trace data comprises:
finding an annotation in the target application identifying a piece of software code in the target application as being associated with the sensitive value;
capturing, from the trace data, a particular value associated with the annotation; and
designating the particular value as the sensitive value.

25. The method of claim 21, wherein identifying an occurrence of a sensitive value in the trace data comprises:
obtaining information from a configuration file identifying a piece of software code in the target application as being associated with the sensitive value;
capturing, from the trace data, a particular value associated with the piece of software code; and
designating the particular value as the sensitive value.

26. The method of claim 21, wherein identifying an occurrence of a sensitive value in the trace data comprises:
determining that a pattern matching expression, applied to the trace data, matches a particular value; and
designating the particular value as the sensitive value.

27. The method of claim 21, wherein identifying an occurrence of a sensitive value in the trace data comprises:
receiving a notification from the target application that a particular value is sensitive.

28. The method of claim 21, wherein generating trace data comprises:
generating, by the instrumentation code, trace data in response to the target application receiving a request to perform operations;
storing the trace data in a trace object during processing, by the target application, of the request; and
storing the trace object in a queue of trace objects.

29. The method of claim 28, wherein obtaining the trace object comprises:
determining, at periodic times, whether the queue stores a trace object; and
upon a positive determination that the queue stores a trace object, obtaining the trace object from the queue.

30. The method of claim 21, wherein the trace data comprises at least one of (i) parameter values for methods invoked in the target application during execution, (ii) return values for methods invoked in the target application during execution, (iii) database queries transmitted by the target application during execution, (iv) database responses received by the target application during execution, (v) web request contents transmitted by the target application during execution, or (vi) web response contents received by the target application during execution.

31. The system of claim 1, wherein the instrumentation code maintains in the data structure a list of sensitive values as the instrumentation code encounters the sensitive values during execution of the target application.

32. The system of claim 1, wherein the operations comprise:
identifying, by the instrumentation code, occurrences of one or more values that are not sensitive, and not storing the values that are not sensitive in the data structure;
finding occurrences of values that are not sensitive in the trace object; and
not obscuring in the trace object the occurrences of values that are not sensitive.

33. The computer-readable storage media of claim 11, wherein the instrumentation code maintains in the data structure a list of sensitive values as the instrumentation code encounters the sensitive values during execution of the target application.

34. The computer-readable storage media of claim 11, wherein the operations comprise:
identifying, by the instrumentation code, occurrences of one or more values that are not sensitive, and not storing the values that are not sensitive in the data structure;
finding occurrences of values that are not sensitive in the trace object; and
not obscuring in the trace object the occurrences of values that are not sensitive.

35. The method of claim 21, further comprising:
maintaining in the data structure a list of sensitive values by the instrumentation code as the instrumentation code encounters the sensitive values during execution of the target application.

36. The method of claim 21, comprising:
identifying, by the instrumentation code, occurrences of one or more values that are not sensitive, and not storing the values that are not sensitive in the data structure;
finding occurrences of values that are not sensitive in the trace object; and
not obscuring in the trace object the occurrences of values that are not sensitive.

* * * * *